Figure 1:
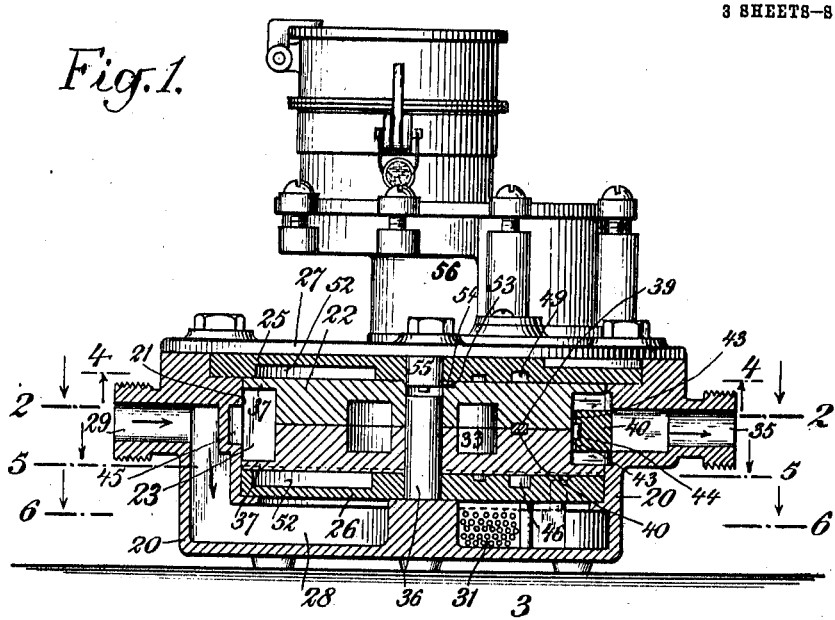

A. B. CALKINS.
ROTARY FLUID OPERATED AND OPERATING DEVICE.
APPLICATION FILED JAN. 24, 1911.

993,648.

Patented May 30, 1911.

3 SHEETS—SHEET 1.

WITNESSES:

INVENTOR

BY

ATTORNEYS

A. B. CALKINS.
ROTARY FLUID OPERATED AND OPERATING DEVICE.
APPLICATION FILED JAN. 24, 1911.
993,648.
Patented May 30, 1911.
3 SHEETS—SHEET 2.
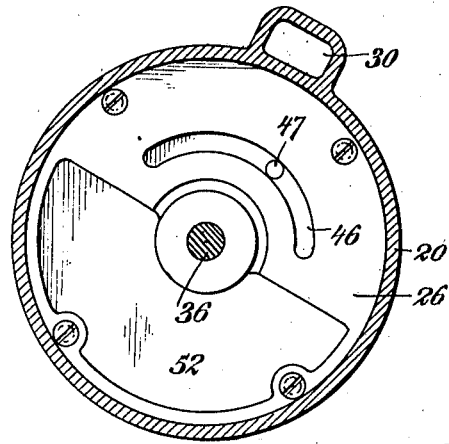
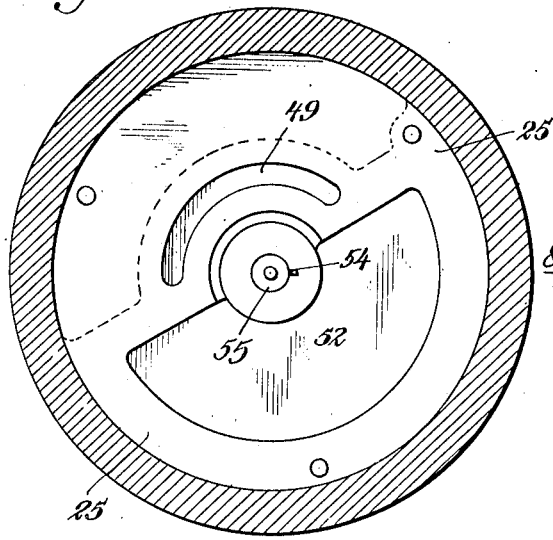
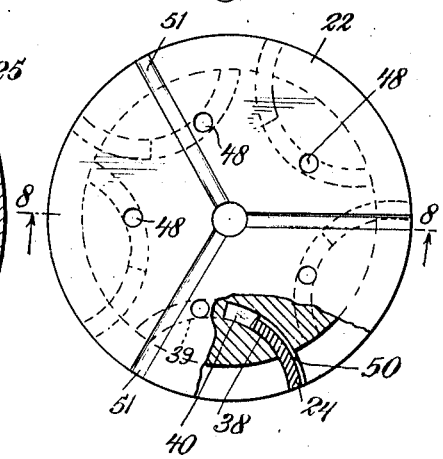
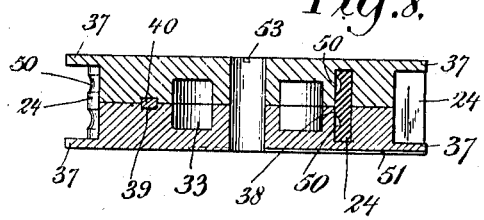
WITNESSES:
INVENTOR
BY
his ATTORNEYS A. B. CALKINS.
ROTARY FLUID OPERATED AND OPERATING DEVICE.
APPLICATION FILED JAN. 24, 1911.
993,648.
Patented May 30, 1911.
3 SHEETS—SHEET 3.
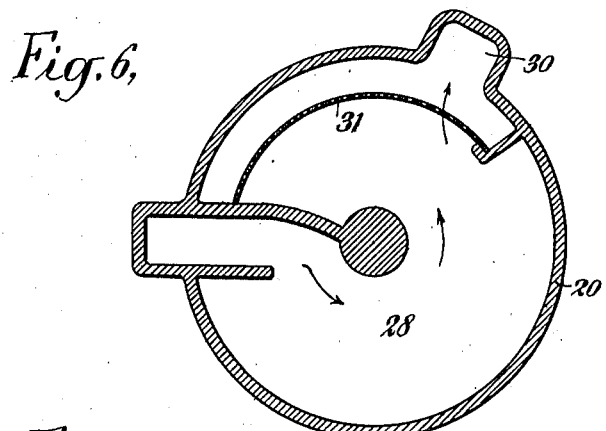
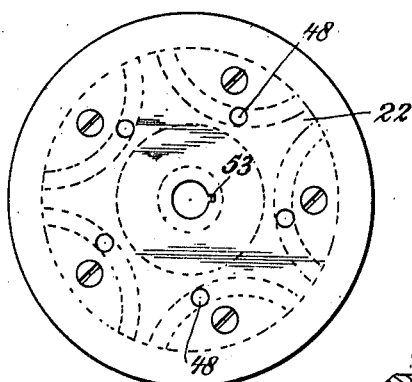
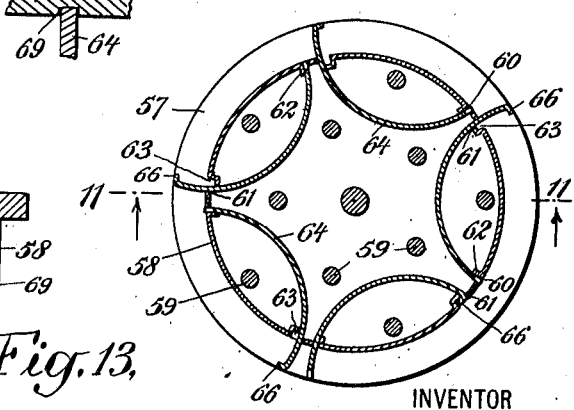
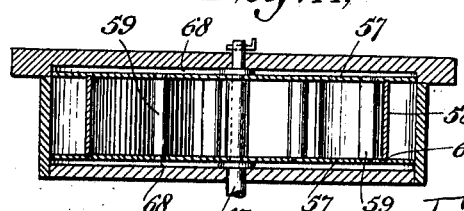
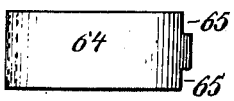
WITNESSES:
INVENTOR
BY
ATTORNEYS

UNITED STATES PATENT OFFICE.

ALMON B. CALKINS, OF PASSAIC, NEW JERSEY.

ROTARY FLUID OPERATED AND OPERATING DEVICE.

993,648.

Specification of Letters Patent.   Patented May 30, 1911.

Application filed January 24, 1911.   Serial No. 604,328.

*To all whom it may concern:*

Be it known that I, ALMON B. CALKINS, a citizen of the United States of America, and a resident of Passaic, county of Passaic, and State of New Jersey, have invented certain new and useful Improvements in Rotary Fluid Operated and Operating Devices, of which the following is a specification, reference being had to the accompanying drawings, forming a part thereof.

My invention relates to rotary devices of the type including rotary meters, rotary mufflers, rotary motors or engines, and the like, in which a rotatable element is rotated by fluid as the operating medium, and rotary pumps and the like wherein the rotatable device is rotated by other means and in its rotation impels the fluid.

For the purpose of the present specification I have shown and will describe an embodiment of my invention constituting a rotary fluid meter, but it will be understood that the same is intended to be in no way a limitation upon the application of the invention, as it will be readily seen that the device in its exact form is capable of other uses and that mere changes such as are within the skill of those conversant with this art will cause similar structure to be adapted for other uses such as those above noted.

In carrying out my invention I employ a stationary casing, a rotary element having a substantially cylindrical bore therein, a rotary element or hub mounted in the said bore but of smaller size than the bore, so that there is a substantially annular space between the rotatable element and the chamber, a plurality of blades in the form of tubular segments carried by the said rotary element arranged to be moved into and out of the said annular channel, and stationary cam means for co-acting with the said segmental blades to operate them as the hub rotates.

My invention consists in many novel details of construction and combinations of parts such as will be fully pointed out hereinafter, and in order that my invention may be thoroughly understood, I will now proceed to describe an embodiment thereof, having reference to the accompanying drawings illustrating the same, and will then point out the novel features in claims.

Figures 2, 15:
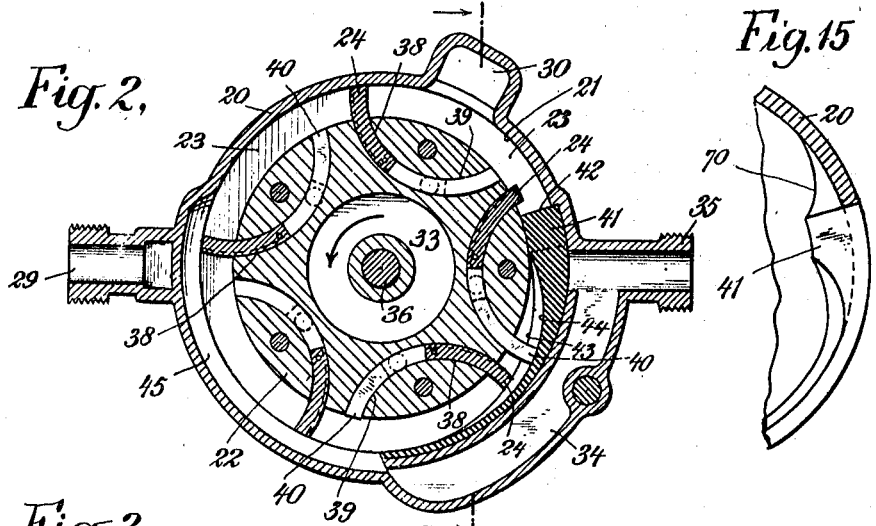
Figure 3:
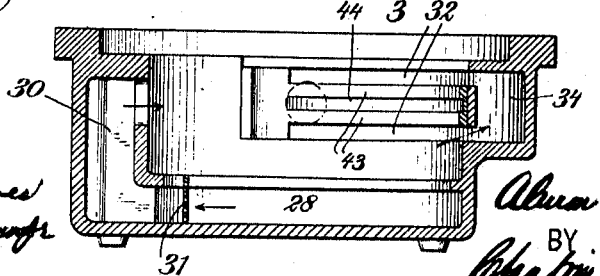

In the drawings: Figure 1 is a view in part side elevation and part central vertical section through a meter constructed in accordance with my invention. Fig. 2 is a view in horizontal section therethrough, the plane of section being indicated by the line 2—2 in Fig. 1. Fig. 3 is a detail vertical section through the casing, the plane of section being indicated by the line 3—3 of Fig. 2. Fig. 4 is a horizontal transverse section through the casing upon the line 4—4 of Fig. 1, the point of view being in a direction looking upward. Fig. 5 is a horizontal transverse section through the casing upon the line 5—5 of Fig. 1, the point of view thereof looking downward. Fig. 6 is a view in horizontal section, also looking downward, upon the line 6—6 of Fig. 1. Fig. 7 is a detail underside view of the rotary element removed from its casing. Fig. 8 is a central vertical section therethrough, as indicated by the line 8—8 of Fig. 7. Fig. 9 is a detail top view of the rotatable element. Fig. 10 is a detail view in side elevation of one of the segmental blades employed showing the same as removed from the rotatable element. Fig. 11 is a detail vertical transverse section through a modified form of the structure in which the rotatable element and its blades are made of sheet metal. Fig. 12 is a detail horizontal section through the rotatable element employed in the structure shown in Fig. 11. Fig. 13 is a detail view in side elevation of one of the segmental blades of the structure shown in Figs. 11 and 12. Fig. 14 is a detail view showing, upon a larger scale, certain guiding slots employed for the form of operating blades used in the construction shown in Figs. 11 to 13 inclusive. Fig. 15 is a detail view showing an additional cam surface which may be employed when the rotatable member is adapted to be moved backward.

The structure shown comprises in general a stationary casing 20 having a cylindrical bore 21 therein, a cylindrical hub rotatably mounted concentrically in the said cylindrical bore, the peripheral diameter of the cylindrical hub being in the main of smaller diameter than the diameter of the bore in the casing so that an annular chamber 23 is arranged between them, and a plurality of segmental blades 24 carried by the said hub and arranged at the proper times to project into the said annular chamber. The upper and lower ends of the cylindrical bore in the casing are closed by means of diaphragms 25—26, an upper head 27 being securely bolted to the upper end of the casing proper to retain the parts in their proper position. At its lower end the casing is provided with an inlet chamber 28 in open communication at its inlet end with a screw-threaded hub 29 to which the inlet pipe may be connected, the discharge end of the said inlet chamber being connected through a passage 30 with the annular chamber 23, as will be readily understood particularly by reference to Figs. 2, 3, and 6 of the drawings. A perforated screen 31 may be conveniently employed in the said inlet chamber through which the incoming fluid may pass and by which it will be filtered to such an extent as to prevent solid matter of any size from passing into the machine. The annular chamber 23 discharges through a peripheral recess 45 in the wall of the casing 20, which recess is in open communication through one or more elongated slots 32 with a curved channel 34, formed in the casing, and in turn communicating with a screw-threaded discharge hub 35 to which the discharge pipe may be connected.

The rotary element 22 is mounted concentrically as above stated, in the bore 21, upon a central stud 36 uprising from the bottom of the casing. In the form shown in Figs. 1 to 10 inclusive this hub is substantially solid, except for a small chamber 33, formed for the purpose of reducing the weight thereof, the said element being conveniently formed of hard rubber or other suitable light weight material. While the peripheral diameter of the main portion thereof is of smaller diameter than the interior bore 21, the said element is conveniently provided with flanges 37 at the upper and lower ends which extend out into substantial engagement with the walls of the casing. This hub is provided with a plurality of curved channels 38 each of which is arranged to receive a curved operating blade 24. The curves of the channels are constructed upon arcs of circles, the blades being in the form of cylindrically tubular segments. The blades are arranged to slide in the said channels, and each of the blades is provided with a portion constituting a curved finger 40, which projects rearwardly therefrom and is fitted to a reduced portion 39 of the channel 38, as is clearly shown in Figs. 2 and 8 and the detail Fig. 10.

Disposed in the annular chamber 23 is an element 41, the forward end 42 of which constitutes an abutment between the inlet and exhaust channels. At the rear of the abutment portion the element 41 is tapered to form two sets of cam surfaces 43—44, the former arranged to co-act with the front edges of the blades 38, and the latter to co-act with the rear ends of the fingers 40 of the blades. The cam surface 44 is disposed between two similar cam surfaces 43, as is shown in Figs. 1 and 3, the cam surface 44 being of a sufficient width to receive the narrow fingers 40 while the broader faces of the blades themselves bridge the cam surface 44 and rest upon the two surfaces 43.

The operation of the device is as follows: Fluid being admitted through the passage 30 enters the annular chamber 23 and is confined therein between the walls of the casing, the peripheral wall of the rotary element, the forward face of the abutment 42, and the inner side face of one of the blades 24. The fluid being under pressure and the abutment 42 being immovable, the fluid in pressing against the blade 24 will rotate the element 22 in the direction of the arrow in Fig. 2. As this happens the finger portion 40 of the next succeeding blade in the direction of rotation of the element 22 will ride up along the cam surface 44 so that the forward end of the said next succeeding blade will be gradually moved into the chamber 23 until the extremity thereof engages the wall 21 of the casing 20. This position of the blade will be effected when the blade reaches the inlet passage 30, so that in the further movement of the rotary element the said blade will be acted upon by the incoming fluid to further propel the rotary element in the manner just described in connection with the preceding blade. The blades will be carried around this position until the forward ends thereof successively reach the cam surfaces 43. Then in the further movement of the rotary element the blades will be gradually forced back to a position wherein their forward ends will come flush with the periphery of the rotary element so that they will pass the abutment 42. One of the blades is shown as just commencing to ride up upon the cam surfaces 43 in Fig. 2. The water contained in the annular channel 23 behind the blades will be discharged through the elongated slot or slots 32 as the forward ends of the blades reach the said slots as will be well understood by reference to the drawing.

The employment of the two cam surfaces 43 and 44 for operating respectively on the front and rear ends of the blade elements is quite important in reducing friction, this being for the reason that the angles presented by the opposite ends of the blades with a line concentric with the axis of rotation of the rotary members, differs. It is advantageous to move the blades into their operative positions as quickly as possible, and the cam surface 44 is made with a relatively quick rise for this purpose. This rise is possible because of the angles at which the rear fingers of the blades are presented thereto. On the other hand the angle at which the forward ends of the blades engage the cam surfaces is such as to require a slower rise cam, and such cam is consequently provided, the greater length of time taken in consequence thereof to return the blades to their inoperative positions, being immaterial.

For the purpose of balancing the parts as much as possible I have provided the movable and stationary elements with the following balancing channels. The lower diaphragm is provided with a curved recess 46 which communicates through an opening 47 with the inlet chamber 28. The rotatable member 22 is provided with a set of passages 48 which communicate with this curved channel 46 and with the curved blade receiving channels 38. These passages 48 are arranged in the upper and lower parts of the rotatable member, the upper passages communicating with a curved channel 49 in the lower face of the upper diaphragm 25 corresponding to the curved channel 46 in the lower diaphragm. By this means water is admitted upon the top and bottom edges of the curved blades 24 so as to substantially balance them. The blades 24 themselves are provided upon their rear faces with channels 50 by which water or other fluid in the annular channel 23 is allowed to pass from the front to the rear of the said blades in order to balance them longitudinally, it being remembered that the curved channels 38 in the rotatable member in which the said blades are mounted, are reduced at the rear ends thereof, being that portion which receives the rearwardly projecting fingers 40, the said fingers accurately fitting the said reduced portions with a sliding fit, so that the fluid thus permitted to pass to the back of the blades 24 will not be permitted to pass freely to the discharge side of the chamber 23. The lower face of the rotatable member 22 may also be provided with radial channels 51 (see Fig. 7) into which the fluid passing through the machine will gradually leak to form a lubrication between the bottom face of the said rotatable member and the upper face of the diaphragm 26, and portions of the inner faces of the upper and lower diaphragms 25 and 26 may be recessed as at 52 to reduce the extent of the working surfaces and frictional contact. These recessed spaces 52 will also fill with liquid in the operation of the machine such as will tend to balance as well as to lubricate the central rotating member.

In a structure intended to be employed as a meter it will of course be necessary to connect the rotatable member with suitable registering means, and in the present instance I have shown the rotatable device as provided with a slot 53 (see Figs. 1 and 8) arranged to receive a key 54 (see Fig. 1) carried by a stem or arbor 55 such as connects with, and forms a part of, the said registering means. As the registering means *per se* forms no part of my present invention I have not illustrated it in detail herein, but in Fig. 1 I have shown an upper casing 56 for containing it and the stem or arbor 55 as projecting downward from the said casing through the upper head 27.

In Figs. 11, to 14, I have shown a sheet metal construction such as may be employed for some purposes. For instance, while a hard rubber disk may be used for cold water meters, the sheet metal construction would be more desirable in the measurement of hot water, or of steam, though of course the sheet metal construction could also be employed in the measurement of cold water if preferred. In the sheet metal construction I have shown the rotatable element as comprising upper and lower disks 57, and a circular shell 58 between them, the whole being united by studs or rivets 59. In this case in lieu of providing the rotatable element with extended channels for receiving the operating blades, I have formed slots 60—61 in the shell, portions of the metal constituting the shell being turned backward to slightly extend the bearing surface. In the slot 60 such portions are turned over at substantially right angles to the shell, projecting inward therefrom, while in the case of the slot 61 the metal is turned back at right angles and again parallel therewith to form a recess 63. Blades 64, corresponding to the blades 24 of the other structure, are in this form preferably of substantially the same width throughout except that at their extremities portions 65—65 are cut away so as to clear the cam surfaces 43 when the extremities of the said blades are engaged by the cam surface 44. The forward ends of the blades are preferably turned over as at 66, this being for the purpose of obtaining a slightly wider bearing surface against the inner edge of the cylindrical casing, and also for the purpose of assisting in the balancing of the blades. These portions 66 are received in the recesses 63 when the blades are in their rear position, as will be readily understood by reference to Fig. 12. In this particular construction I have shown the rotatable element as mounted upon a central rotating shaft 67 instead of upon a stationary stud as in the other structure, which shaft may be extended to the exterior of the casing as will be well understood, to constitute a means by which the device may be driven as where it is used for pumping purposes, or from which power may be taken when the device is used as a motor or engine.

In this construction I have also shown clearance spaces 68—68 above and below the rotatable member, and the entire interior of the rotatable member will be filled with fluid which will leak past the slotted openings 60—61 for the blades. Preferably the inner faces of the upper and lower disks 57 of the rotatable member will be recessed as appears at 69 in Fig. 11 and the detail Fig. 14, to form curved guides for the blades 64.

Where the device is used as an engine, or in any construction wherein the rotating element might be required to run backward, I preferably provide an additional cam surface 70 as appears in Fig. 15, the said cam surface operating upon the front end of the blades to force them back in the rearward movement of the rotating element, as will be well understood.

What I claim is:

1. A rotary device of the character described comprising a casing having a cylindrical bore therein, a hub concentrically mounted in the bore but of smaller diameter than the bore, whereby an annular chamber is formed between the periphery of the hub and the walls of the bore, the said casing having inlet and discharge passages communicating with the said chamber, an abutment across the said chamber, a plurality of blades movably mounted in the hub and arranged to be moved into and out of the said annular chamber, a stationary cam in the casing exterior to the hub for moving the forward end of the blades into the said chamber, and another similarly disposed stationary cam for moving the forward end of the said blades out of the said chamber.

2. A rotary device of the character described comprising a casing having a cylindrical bore therein, a hub concentrically mounted in the bore but of smaller diameter than the bore, whereby an annular chamber is formed between the periphery of the hub and the walls of the bore, the said casing having inlet and discharge passages communicating with the said chamber, an abutment across the said chamber, a plurality of blades in the form of tubular segments movably mounted around the said hub with their concave sides facing outwardly, the said blades having portions at the front and rear ends thereof which are arranged alternately to project across the said annular chamber, a stationary cam in the wall of the casing, to the rear of the said abutment, for engaging the rear ends of the blades to move the forward ends thereof into the said chamber, and another stationary cam for engaging the forward ends of the blades to move them in the opposite direction.

3. A rotary device of the character described comprising a casing having a cylindrical bore therein, a hub concentrically mounted in the bore but of smaller diameter than the bore, whereby an annular chamber is formed between the periphery of the hub and the walls of the bore, the said casing having inlet and discharge passages communicating with the said chamber, an abutment across the said chamber, a plurality of blades in the form of tubular segments movably mounted around the said hub with their concave sides facing outwardly, and provided with rearwardly extending fingers, the forward end of the said blades and the rearward extremity of the said fingers being arranged to move alternately into and out of the said annular chamber, a stationary cam for engaging the rear extremity of the said fingers, and another stationary cam having a more gradual incline, for engaging the forward extremity of the said blades.

4. A rotary device of the character described comprising a casing having a cylindrical bore therein, a hub concentrically mounted in the bore but of smaller diameter than the bore, whereby an annular chamber is formed between the periphery of the hub and the walls of the bore, the said casing having inlet and discharge passages communicating with the said chamber, an abutment across the said chamber, a plurality of blades in the form of tubular segments movably mounted around the said hub with their concave sides facing outwardly, and provided with rearwardly extending fingers, the forward end of the said blades and the rearward extremity of the said fingers being arranged to move alternately into and out of the said annular chamber, a stationary cam for engaging the rear extremity of the said fingers, and other stationary cam surfaces arranged upon either side of the first said cam, for engaging the forward extremity of the said blades, the latter said cam surfaces having a more gradual incline than the first said cam.

5. A rotary device of the character described, comprising a casing having a cylindrical bore therein, a hub concentrically mounted in the bore but of smaller diameter than the bore, whereby an annular chamber is formed between the periphery of the hub and the walls of the bore, the said casing having inlet and discharge passages communicating with the said chamber, an abutment across the said chamber, a plurality of blades in the form of tubular segments movably mounted around the said hub with their concave sides facing outwardly, one end of the said blades being arranged to be moved into and out of the said annular chamber, a stationary cam for moving the forward end of the blades into the said chamber, and another stationary cam for moving the said blades out of the said chamber, the forward extremities of the blades having lateral projections which extend in a direction opposite to the direction of rotation of the hub.

In witness whereof, I have hereunto set my hand this 20th day of January, 1911.

ALMON B. CALKINS.

Witnesses:
   D. HOWARD HAYWOOD,
   LYMAN S. ANDREWS, Jr.